United States Patent
Chukka et al.

(10) Patent No.: US 12,243,230 B2
(45) Date of Patent: *Mar. 4, 2025

(54) GROUP SPARSITY MODEL FOR IMAGE UNMIXING

(71) Applicant: Ventana Medical Systems, Inc., Tucson, AZ (US)

(72) Inventors: Srinivas Chukka, San Jose, CA (US); Ting Chen, Sunnyvale, CA (US)

(73) Assignee: VENTANA MEDICAL SYSTEMS, INC., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,714

(22) Filed: Dec. 19, 2023

(65) Prior Publication Data

US 2024/0135532 A1    Apr. 25, 2024

Related U.S. Application Data

(60) Continuation of application No. 17/391,398, filed on Aug. 2, 2021, now Pat. No. 11,893,731, which is a
(Continued)

(51) Int. Cl.
  *G06T 7/00* (2017.01)
  *G06T 7/90* (2017.01)
  *G06V 20/69* (2022.01)

(52) U.S. Cl.
  CPC .............. *G06T 7/0012* (2013.01); *G06T 7/90* (2017.01); *G06V 20/698* (2022.01);
  (Continued)

(58) Field of Classification Search
  None
  See application file for complete search history.

(56) References Cited

U.S. PATENT DOCUMENTS

| 9,488,639 B2 | 11/2016 | Lange et al. |
| 10,540,762 B2 | 1/2020 | Chukka et al. |

(Continued)

FOREIGN PATENT DOCUMENTS

| JP | 2010243970 A | 10/2010 |
| WO | 2014195193 A1 | 12/2014 |
| WO | 2015124772 A1 | 8/2015 |

OTHER PUBLICATIONS

U.S. Appl. No. 15/243,899, "Final Office Action", mailed on Jan. 10, 2019, 8 pages.
(Continued)

*Primary Examiner* — Randolph I Chu
(74) *Attorney, Agent, or Firm* — Kilpatrick Townsend & Stockton LLP

(57) ABSTRACT

Systems and methods described herein relate, among other things, to unmixing more than three stains, while preserving the biological constraints of the biomarkers. Unlimited numbers of markers may be unmixed from a limited-channel image, such as an RGB image, without adding any mathematical complicity to the model. Known co-localization information of different biomarkers within the same tissue section enables defining fixed upper bounds for the number of stains at one pixel. A group sparsity model may be leveraged to explicitly model the fractions of stain contributions from the co-localized biomarkers into one group to yield a least squares solution within the group. A sparse solution may be obtained among the groups to ensure that only a small number of groups with a total number of stains being less than the upper bound are activated.

20 Claims, 10 Drawing Sheets
(8 of 10 Drawing Sheet(s) Filed in Color)

Related U.S. Application Data continuation of application No. 16/590,942, filed on Oct. 2, 2019, now Pat. No. 11,113,809, which is a division of application No. 15/243,899, filed on Aug. 22, 2016, now Pat. No. 10,540,762, which is a continuation of application No. PCT/EP2015/053745, filed on Feb. 23, 2015.

(60) Provisional application No. 61/943,265, filed on Feb. 21, 2014.

(52) U.S. Cl.
CPC ............. *G06T 2207/10024* (2013.01); *G06T 2207/10056* (2013.01); *G06T 2207/30024* (2013.01); *G06T 2207/30204* (2013.01)

(56) References Cited

U.S. PATENT DOCUMENTS

| | | | |
|---|---|---|---|
| 11,113,809 | B2 | 9/2021 | Chukka et al. |
| 2009/0103801 | A1 | 4/2009 | Messler |
| 2009/0324051 | A1 | 12/2009 | Hoyt et al. |
| 2010/0177950 | A1 | 7/2010 | Donovan et al. |
| 2010/0184093 | A1 | 7/2010 | Donovan et al. |
| 2010/0322502 | A1 | 12/2010 | Otsuka et al. |
| 2011/0236903 | A1 | 9/2011 | Mcclelland et al. |
| 2012/0010528 | A1 | 1/2012 | Donovan et al. |
| 2013/0080134 | A1 | 3/2013 | Donovan et al. |
| 2014/0193050 | A1* | 7/2014 | Miller .................... G06T 5/50 382/128 |
| 2014/0270457 | A1 | 9/2014 | Bhargava |
| 2014/0378500 | A1 | 12/2014 | Cohen et al. |
| 2015/0004598 | A1 | 1/2015 | Gao et al. |
| 2016/0253817 | A1 | 9/2016 | Chen et al. |
| 2023/0352151 | A1 | 11/2023 | Barnes et al. |

OTHER PUBLICATIONS

U.S. Appl. No. 15/243,899, "Non-Final Office Action", mailed on Jul. 17, 2018, 7 pages.
U.S. Appl. No. 15/243,899, "Notice of Allowance", mailed on Jun. 12, 2019, 8 pages.
U.S. Appl. No. 16/590,942, "Notice of Allowance", mailed on May 4, 2021, 9 pages.
U.S. Appl. No. 17/391,398, "Non-Final Office Action", mailed on Jun. 20, 2023, 11 pages.
U.S. Appl. No. 17/391,398, "Non-Final Office Action", mailed on Jan. 5, 2023, 9 pages.
U.S. Appl. No. 17/391,398, "Notice of Allowance", mailed on Nov. 15, 2023, 10 pages.
Boyd et al., "Distributed optimization and statistical learning via the alternating direction method of multipliers", Foundations and Trends in Machine Learning, vol. 3, No. 1, 2010, pp. 1-122.
Chen et al., "Stain Unmixing in Brightfield Multiplex Immunohistochemistry Images", In Medical Image Computing and Computer Assisted Intervention, Machine Learning in Medical Imaging Workshop, 2014, pp. 1-9.
Friedman et al., "A Note on the Group Lasso and a Sparse Group Lasso", Available Online at: https://arxiv.org/pdf/1001.0736.pdf, Jan. 5, 2010, pp. 1-8.
Iordache et al., "Hyperspectral Unmixing with Sparse Group Lasso", Institute of Electrical and Electronics Engineers, International Geoscience and Remote Sensing Symposium, 2011, pp. 3586-3589.
International Application No. PCT/EP2015/053745, "International Preliminary Report on Patentability", Sep. 1, 2016, 13 pages.
International Application No. PCT/EP2015/053745, "International Search Report & Written Opinion", Jul. 22, 2015, 17 pages.
Ruifrok et al., "Quantification of Histochemical Staining by Color Deconvolution", Analytical and Quantitative Cytology and Histology, vol. 23, No. 4, Aug. 2001, pp. 291-299.
Samarov et al., "Validating the LASSO Algorithm by Unmixing Spectral Signatures in Multicolor Phantoms", Proceedings of Society of Photographic Instrumentation Engineers, vol. 8229, Feb. 2012, 9 pages.
Simon et al., "A Sparse-Group Lasso", Journal of Computational and Graphical Statistics, vol. 22, No. 2, Apr. 1, 2013, pp. 231-245.
Simon et al., "Standardization and the Group Lasso Penalty", Statistica Sinica, vol. 22, No. 3, Jul. 2012, pp. 983-1001.

* cited by examiner

GROUP SPARSITY MODEL FOR IMAGE UNMIXING

CROSS-REFERENCE TO RELATED APPLICATIONS

This patent application is a continuation of U.S. patent application Ser. No. 17/391,398, filed on Aug. 2, 2021, which is a continuation of U.S. patent application Ser. No. 16/590,942 filed Oct. 2, 2019, which is a divisional of U.S. patent application Ser. No. 15/243,899 filed Aug. 22, 2016 which is a continuation of International Patent Application No. PCT/EP2015/053745 filed Feb. 23, 2015, which claims priority to and the benefit of U.S. Provisional Patent Application Ser. No. 61/943,265, filed Feb. 21, 2014. Each patent application is incorporated herein by reference as if set forth in its entirety.

BACKGROUND OF THE SUBJECT DISCLOSURE

Field of the Subject Disclosure

The present subject disclosure relates to digital pathology. More particularly, the present subject disclosure relates to color unmixing methods and systems for a multiplex IHC image that can accommodate any number of stain colors.

Background of the Subject Disclosure

Multiplex immunohistochemistry (IHC) staining is an emerging technique for the detection of multiple biomarkers within a single tissue section and has become more popular due to its significant efficiencies and the rich diagnostic information it has. A multiplex IHC slide has the potential advantage of simultaneously identifying multiple biomarkers in one tissue section as opposed to single biomarker labeling in multiple slides. Therefore, it is often used for the simultaneous assessment of multiple hallmarks of cancerous tissue. Often, a cancerous tissue slide is stained by the multiplex assay to identify biomarkers. For example, tumors in human often contain infiltrates (e.g., T-cells or B-cells) of immune cells, which may prevent the development of tumors or favor the outgrowth of tumors. In this scenario, multiple stains are used to target different type of immune cells and the population distribution of each type of the immune cells are used to study the clinical outcome of the patients. The stained slide is then imaged, for example, using a CCD color camera mounted on a microscope or a scanner.

In order to conduct accurate detection and classification of the cells, the cells are stained, for example, with chromogenic dyes, fluorescent markers and/or quantum dots, and then imaged. The image is unmixed to obtain the constituent dyes and/or the proportions of each dye in the color mixture, as a prerequisite step for multiplex image analysis, for example, multiplex IHC image analysis. Several techniques exist in the prior art to decompose each pixel of the RGB image into a collection of constituent stains and the fractions of the contributions from each of them. For example, color unmixing or deconvolution is used to unmix the RGB image with up to three stains in the converted optical density space. Given the reference color vectors $x_i \in R^3$ of the pure stains, the method assumes that each pixel of the color mixture $y \in R^3$ is a linear combination of the pure stain colors and solves a linear system to obtain the combination weights $b \in R^M$. The linear system is denoted as $y=Xb$, where $X=[x_1, \ldots, x_M](M \leq 3)$ is the matrix of reference colors. This technique is most widely used in the current digital pathology domain, however, the maximum number of stains that can be solved is limited to three as the linear system is deficient for not enough equations (X being a 3×M matrix). The color unmixing problem may be formulated into a non-negative matrix factorization and color decomposition performed in a fully automated manner, wherein no reference stain color selection is required. This method also solves for y=Xb and has the same limitation in dealing with large stain numbers. A color space may be divided into several systems with up to three colors by solving a convex framework, with a linear system being used to solve each individual system. Due to the independent assignment of each pixel into different systems, the spatial continuity is lost in the unmixed images and artifacts such as holes are observed.

Other methods may work for a larger number of stain colors, such as two-stage methods developed in the remote sensing domain to first learn the reference colors from the image context and then use them to unmix the image, however, these methods are designed to work for multi-spectral image unmixing which has more color channels than the RGB image. Sparse models for high dimensional multi-spectral image unmixing adopt the $L_0$ norm to regularize the combination weights b of the reference colors hence leading to a solution that only a small number of reference colors are contributed to the stain color mixture, but these are also designed for multi-spectral images and do not use any prior biological information about the biomarkers, which may lead to undesired solutions for real data. Moreover, these methods cannot be applied to RGB images due to the image acquisition system, i.e. multi-spectral imaging instead of a CCD color camera to capture the image using a set of spectral narrow-band filters. The number of filters K can be as many as dozens or hundreds, leading to a multi-channel image that provides much richer information than the brightfield RGB image. The linear system constructed from it is always an over-determined system with X being a $K \times M (K \gg M)$ matrix that leads to a unique solution, however, the scanning process in the multi-spectral imaging system is very time consuming and only a single field of view manually selected by a technician can be scanned instead of the whole slide, thereby limiting the usage of such methods.

Therefore, there exists no numerical solution for unmixing an image having more unknown variable than the number of equations in the least squares system. To accurately unmix an IHC image and differentiate all the stains used is of tremendous clinical importance since it is the initial key step in multiplex IHC image analysis of digital pathology. Due to the limitations of a CCD color camera, an acquired RGB or brightfield image only contains three channels, the unmixing of which into more than three colors is a challenging task. Accordingly, a method for unmixing, which compensates for the limitations of the CCD color camera, is desirable.

SUMMARY OF THE SUBJECT DISCLOSURE

The present invention provides in particular for a tissue analysis system and method, a system for unmixing a tissue image and a digital storage medium that stores digitally encoded instructions executable by a processor of a tissue analysis system for configuring the tissue analysis system for execution of a method of the invention.

The subject disclosure solves the above-identified problems in the current state of the art by providing systems and methods for unmixing multiplex IHC images having a number of stain contributions greater than a number of color channels, such as an RGB brightfield image. Operations disclosed herein include obtaining reference colors from the training images, modeling a RGB image unmixing problem using a group sparsity framework, in which the fractions of stain contributions from colocation markers are modeled within a same group and fractions of stain contributions from non-colocation markers are modeled in different groups, providing co-localization information of the markers to the group sparsity model, solving this group sparsity model using an algorithm such as a Group Lasso, yielding a least square solution within each group which corresponds to the unmixing of the colocation markers, and yielding a sparse solution among the groups that correspond to the unmixing of non-colocation markers. Reduction of the model to sparse unmixing without colocation constraint is enabled by setting only one member in each group, and generating sparse unmixing results for more than two or three markers, in contrast to typical methods without sparse regularization.

In one exemplary embodiment, the subject disclosure provides a method for unmixing an image, the method comprising generating a group sparsity model wherein a fraction of a stain contribution from colocation markers is assigned within a single group and a fraction of a stain contribution from non-colocation markers is assigned within separate groups, and solving the group sparsity model using group lasso algorithm to yield a least squares solution within each group and sparse solution among groups. The method, like all other methods disclosed herein, may be a computer-implemented method.

In another exemplary embodiment, the subject disclosure provides a system for unmixing an image, comprising a processor, and a memory coupled to the processor, the memory to store digitally encoded instructions that, when executed by the processor, cause the processor to perform operations including generating a group sparsity framework using known co-location information of a plurality of biomarkers within an image of a tissue section; wherein a fraction of each stain contribution is assigned to a different group based on the known co-location information, and solving the group sparsity model using group lasso algorithm to yield a least squares solution for each group.

In yet another exemplary embodiment, the subject disclosure provides a digital storage medium to store digitally encoded instructions executable by a processor to perform operations including modeling an RGB image unmixing problem using a group sparsity framework, in which fractions of stain contributions from a plurality of colocation markers are modeled within a same group and fractions of stain contributions from a plurality of non-colocation markers are modeled in different groups, providing co-localization information of the plurality of colocation markers to the modeled group sparsity framework, solving the modeled framework using a group lasso to yield a least squares solution within each group, wherein the least squares solution corresponds to the unmixing of the colocation markers, and yielding a sparse solution among the groups that corresponds to the unmixing of the non-colocation markers.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE SUBJECT DISCLOSURE

Figure 1:
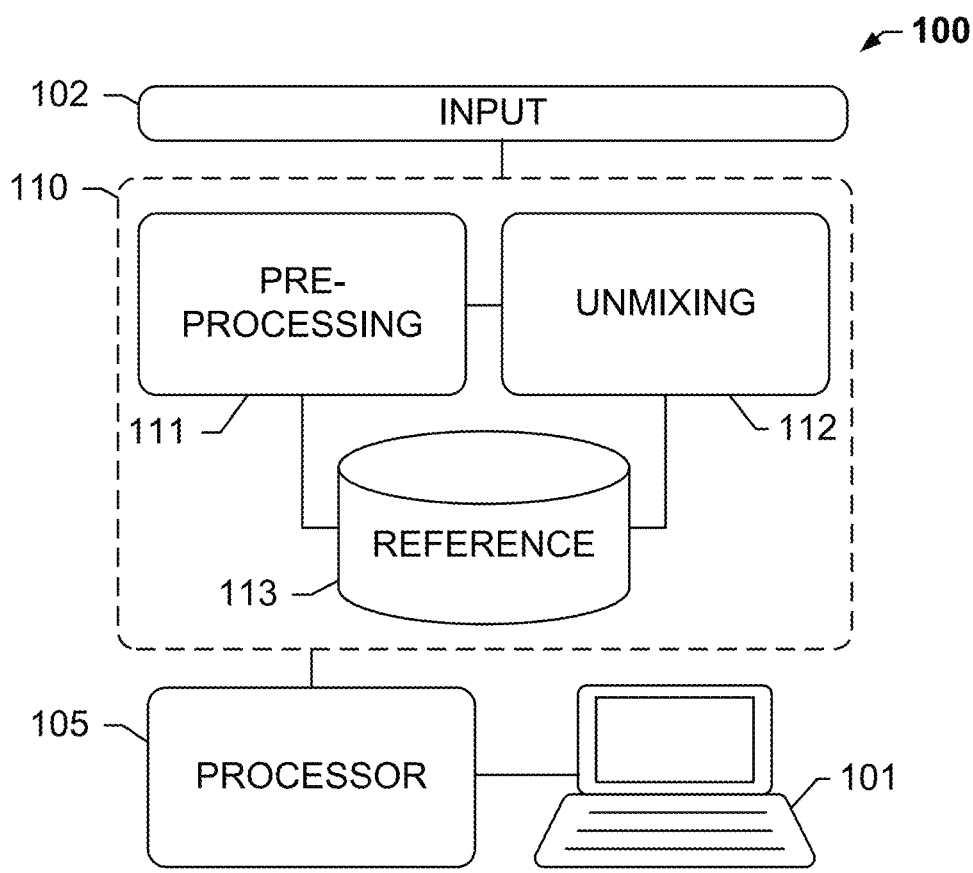
FIG. 1 depicts a system for image unmixing using a group sparsity model, according to an exemplary embodiment of the subject disclosure.

Before elucidating the embodiments shown in the Figures, various embodiments of the present disclosure will first be described in general terms.

The present disclosure relates, inter alia, to an analysis system, e.g. to a tissue analysis system. The system may be suitable for analyzing biological specimen, for example, tissue provided on a slide.

The term "image data" as understood herein encompasses raw image data acquired from the biological tissue sample, such as by means of an optical sensor or sensor array, or pre-processed image data. In particular, the image data may comprise a pixel matrix.

The analysis system may comprise a color data storage module that stores color data, e.g. color data indicative of a color of the stains. Such color data is also referred to as "reference data". The color data may be descriptive of a single frequency or a characteristic spectral profile of the stain. The color data storage module may store color data for each of a plurality of stains. The plurality of stains may comprise at least 4, at least 10, at least 20 or at least 100 stains.

In the present disclosure, the term "biomarker" may be understood in the sense of a tissue feature (e.g. (a presence of) a particular cell type, for instance immune cells), in particular a tissue feature indicative of a medical condition. The biomarker may be identifiable by the presence of a particular molecule, for instance a protein, in the tissue feature.

In the present disclosure, the term "marker" may be understood in the sense of a stain, dye or a tag (that allows a biomarker to be differentiated from ambient tissue and/or from other biomarkers). The tag may be stained or dyed. The tag may be an antibody, e.g. an antibody having an affinity to a protein of a particular biomarker. A marker may have an affinity to a particular biomarker, e.g. to a particular molecule/protein/cell structure/cell (indicative of a particular biomarker). The biomarker to which a marker has an affinity may be specific/unique for the respective marker. A marker may mark tissue, i.e. a biomarker in the tissue, with a color. The color of tissue marked by a respective marker may be specific/unique for the respective marker. For short, the present disclosure designates such relationships between a color and a marker as a "marker having a color" or as a "color of a marker."

Any of the plurality of markers may have an affinity to at least one tissue feature selected from the group consisting of a tumor cell cytokeratin, a regulatory T-cell nucleus, a universal nucleus, a B-cell membrane, a universal T-cell membrane, and a cytotoxic T-cell membrane.

The analysis system may comprise a co-location data storage module that defines a plurality of groups of the markers (whose color data is stored by the color data storage module). Each group may consist of markers having an affinity to a respective common tissue feature. In other words, each marker of a respective group may have an affinity to a common tissue feature. The common tissue feature to which (each of) the markers of a respective group have an affinity may be unique for each respective group. Each of the plurality of groups may consist of at least one and no more than three markers. The plurality of groups may comprise each of the plurality of markers. In other words, the plurality of groups may be defined such that each individual marker of the plurality of markers belongs to at least one group of the plurality of groups.

The analysis system may comprise a tissue image data storage module that stores a plurality of pixels representative of a tissue image. The tissue image may be an RGB, a CYMK image or other multi-channel color image (of a tissue sample). The multi-channel color image may comprise from 1 to 10, e.g. from 3 to 5, (color) channels. As such, each pixel may comprise color information for any of a plurality of color channels, e.g. for each of a red, green and blue channel of an RGB image.

The pixels may represent the tissue image (at a resolution) such that (in at least 50%, at least 75% or at least 90% of all cases) at least one pixel is required to represent any individual biomarker of the biomarkers identifiable by the plurality of markers or the background. In other words, the pixels may represent the tissue image (at a resolution) such that (in at least 50%, at least 75% or at least 90% of all cases) any individual biomarker of the biomarkers identifiable by the plurality of markers or the background occupies at least one pixel. Similarly, the pixels may represent the tissue image such that, by virtue of the image resolution and a biological co-location (in tissue) of the molecules/proteins/cell structures/cells to which the individual markers of the plurality of markers have an affinity, at most three markers are visible per pixel (for at least 50%, at least 75% or at least 90% of the pixels). The expression "at most three markers" is not limited to the sense that at most three individual antibody tags (or other individual markers) are visible per pixel. Instead, the expression "at most three markers" may be understood in the sense that, of the plurality of markers, at most three of the plurality are visible per pixel. In other words, the colors constituting an individual pixel (in addition to the natural colors of the tissue) may be limited to three colors selected from the group of tissue colors obtained by marking tissue with the plurality of markers. As such, for any of the plurality of groups, the number of markers in the respective group may define an upper limit for the number of (different kinds of) stains, i.e. markers, per pixel. However, mathematically, the framework is not limited to the constraint of "at most three markers". In the present context, the term "stain" may be understood in the broad sense of any type of marker such as an antibody, dye or stain suitable to mark, i.e. "stain," biomarkers in a tissue.

The analysis system may comprise a tissue image analysis module (for unmixing the tissue image). The tissue image analysis module may (be configured to) calculate a linear combination of the colors of the markers of a respective group that yields a minimum difference between (the color information of) a respective pixel and the linear combination of colors. The tissue image analysis module may calculate such a linear combination for any individual group of the groups and for any individual pixel of the plurality of pixels. In other words, the tissue image analysis module may unmix (e.g. as understood in the art of imaging spectroscopy) a pixel into the colors of the markers of a respective group, e.g. by finding a linear combination of the colors of the markers of a respective group that (closely/most closely) matches the color of a respective pixel (as represented by the color channels of the respective pixel). The aforementioned "minimum" difference need not be understood as a mathematical minimum or as an absolute minimum. Instead, the "minimum" difference may be "minimum" as determinable by data available to the tissue image analysis module. The difference between a linear combination of the colors of the markers of a respective group and the respective pixel may be measured in a color space of the respective pixel, e.g. as a polynomial that comprises, for each (color) channel of the pixel, the difference between the respective linear combination and the value of the pixel in the respective channel as a variable. For example, the difference may be measured as a sum of the squares obtained by squaring, for each (color) channel of the pixel, the difference between the respective linear combination and the value of the pixel in the respective channel. As such, the tissue image analysis module may calculate a linear combination of the colors of the markers of a respective group that yields a minimum difference between a respective pixel and the linear combination by means of a least square algorithm.

The tissue image analysis module may affect the aforementioned calculating using any of the color data stored in the color data storage module, any of the co-location data stored in the co-location data storage module and/or any of the plurality of pixels stored in the tissue image data storage module. Accordingly, the tissue image analysis module may be configured to read any of the color data from the color data storage module, to read any of the co-location data from the co-location data storage module and/or to read any of the pixels from the tissue image data storage module.

The tissue image analysis module may determine a group for which the (aforementioned) minimum difference (between a respective pixel and a linear combination of the colors of the markers of the respective group) is smallest and may output (data indicative of) the tissue feature of the (determined) group as an analysis result. In other words, the tissue image analysis module may determine which group of markers has colors that can be combined to most closely match a respective pixel and may output (data indicative of) the (determined) group as an analysis result.

The (tissue) analysis system may comprise a (tissue) staining module that stains a tissue sample with any of the plurality of markers. In the present context, the verb "stain" is not limited to an application of a stain (in a limited sense of the word) to a tissue, but may instead likewise comprise exposing the tissue to any type of markers such as antibodies or dyes to mark biomarkers in the tissue.

The tissue image data storage module may receive the plurality of pixels directly or indirectly from a source that need not be an element of the (tissue) analysis system. In this respect, the (tissue) analysis system may comprise a (tissue) imaging module, e.g. a (tissue) imaging module that images a tissue sample to obtain the plurality of pixels representative of a tissue image. The tissue sample may be a tissue sample stained with any of the plurality of markers, e.g. by the (tissue) staining module. The imaging module may utilize nonvisible electromagnetic radiation (UV light, for example), magnetic resonance, ultrasound or other imaging techniques to capture the tissue image. The (tissue) imaging module may comprise a microscope and a (CCD) camera arranged to capture a plurality of (raw) pixels representative of an image of a tissue sample magnified by the microscope. The plurality of pixels stored by the tissue image data storage module may be identical to and/or derived from raw pixels captured by the (tissue) imaging module. One of ordinary skill in the art would recognize that other image sensors or methods for capturing an image, such as a digital image, may be utilized.

The (tissue) imaging module may comprise a bright-field illumination module that effects bright-field illumination of the tissue sample and may effect capture of the plurality of pixels representative of an image of the tissue sample during bright-field illumination of the tissue sample.

As touched upon above, the (tissue) imaging module may comprise a CCD camera, e.g. a CCD camera selected from the group consisting of an RGB CCD camera and a CCD camera having at most five color channels. The (tissue) imaging module may effect imaging, i.e. capture of the plurality of pixels representative of an image of the tissue sample, by means of a CCD camera selected from the group consisting of an RGB CCD camera and a CCD camera having at most five color channels. For example, the CCD camera may capture pixels in each of a red, green and blue channel or in each of a red, green, blue and UV channel. The CCD camera may comprise a beam splitter for splitting incident light into the various (color) channels for capture.

The present disclosure relates, inter alia, to an analysis method, e.g. to a tissue analysis method. The method may be suitable for analyzing biological tissue provided on a slide. As such, the aforementioned discussion of an analysis system applies mutatis mutandis, to an analysis method employing the techniques described above.

The various embodiments of the present disclosure having been described above in general terms, the embodiments shown in the Figures will now be elucidated.

Systems and/or methods described herein relate to unmixing more than three stains (for example, chromogenic dyes, fluorescent stains, or quantum dots), while preserving the biological constraints of the biomarkers. Unlimited numbers of markers may be unmixed from a limited-channel image, such as an RGB image, without adding any mathematical complicity to the model. Known co-localization information of different biomarkers within the same tissue section enables defining fixed upper bounds for the number of stains at one pixel. A group sparsity model may be leveraged to explicitly model the fractions of stain contributions from the co-localized biomarkers into one group to yield a least squares solution within the group. A sparse solution may be obtained among the groups to ensure that only a small number of groups with a total number of stains being less than the upper bound are activated. Results of applying these methods on a clinical data set containing a large number of multiplex IHC slides demonstrates better unmixing results than the prior art.

FIG. 1 depicts a system 100 for image unmixing using group sparsity modeling, according to an exemplary embodiment of the subject disclosure. System 100 comprises a memory 110, which stores a plurality of processing modules or logical instructions that are executed by processor 105 coupled to electronic processing device 101, for example a computer. Besides processor 105 and memory 110, electronic processing device 101, which may be a computer, also includes user input and output devices such as a keyboard, mouse, stylus, and a display/touchscreen. As will be explained in the following discussion, processor 105 executes logical instructions stored on memory 110, performing image analysis and other quantitative operations resulting in an output of results to a user operating electronic processing device 101 or via a network.

For instance, input data 102 may provide a means for inputting image data from one or more scanned IHC slides to memory 110. Image data may include data related to color channels or frequency channels. For instance, a biological specimen, for example, a tissue section may need to be stained by means of application of a staining assay containing one or more different biomarkers associated with chromogenic stains for brightfield imaging or fluorophores for fluorescence imaging. Staining assays can use chromogenic stains for brightfield imaging, organic fluorophores, quantum dots, or organic fluorophores together with quantum dots for fluorescence imaging, or any other combination of stains and viewing or imaging devices. In the analysis of biological specimens, for example, cancerous tissues, different stains are specified to identity one or more types of biomarkers, for example, immune cells. For instance, CD3 is a known universal marker for all the T-cells and CD8 only captures the cytotoxic T-cells in the membrane. FoxP3 marks the regulatory T-cells in the nuclei and Hematoxylin (HTX) stains all the nuclei. Therefore, input 102 may further include co-location information for different biomarker, as co-localization information of the markers can be inferred from the biological knowledge. For example, CD3 and CD8 co-locate in the membrane while FoxP3 and HTX may appear in the same nucleus. Tumor markers on the tumor cell's cytoplasm region coexist with B-cell markers on the B-cell's membrane.

Upon receiving this image data and co-location information, a plurality of processing modules may be executed in order to analyze the image data and unmix the image using a group sparsity framework. A pre-processing module 111 may be executed for converting an image such as an RGB image into an optical density (OD) space using the following formula derived from Beer's law based on the fact that the optical density is proportional to the stain concentration, using:

$$O_c = -\log\left(\frac{I_c}{I_{0,c}}\right)$$

where c is the index of the RGB color channels, $I_0$ is the RGB value of the white points and O is the optical density image obtained. O is utilized to reference an image as further described below.

An unmixing module 112 may be invoked to unmix the optical density image O. Let y be a pixel of O, where y represents a 3-dimensional column vector corresponding to the OD values converted from RGB. If there are M biomarkers available in the multiplex IHC slide, that provides M stain colors. Let b be the combination weight vector of the stains and $b_m$, m=1, ..., M is the $m_{th}$ element of b. A typical unmixing problem may thus be formulated as the following:

$$\min_b \|y - Xb\|_2^2$$

Each column of X corresponds to a reference stain color sampled from a control slide of pure stain or approximate pure stain. Reference colors may be stored in and retrieved from a reference database 113, or provided externally from a network. This linear system has a solution only when the column of X is less than or equal to 3 for $y \in R^3$. Therefore, meaningful regularization may facilitate finding a solution for the linear system. The biomarker co-localization information provides a partition of b into a set of groups N being the total number of groups. Within each group, the biomarkers are known to have the co-localization possibility; these biomarkers are also referred herein as co-localization or colocation markers. The method of the present invention adopts this biological information (input via input 102) to formulate the regularization term of the cost function. Let $g_i$ be a $q_i$-dimensional column vector representing the combination weights of the stains within the $i_{th}$ group and qi be the number of stains within the group $g_i$. This provides $q_1+q_2 \ldots +q_N=M$. $x_i$ denotes the $i_{th}$ group of reference colors, resulting in a $3 \times q_i$ matrix as depicted in FIG. 2.

Figure 2:
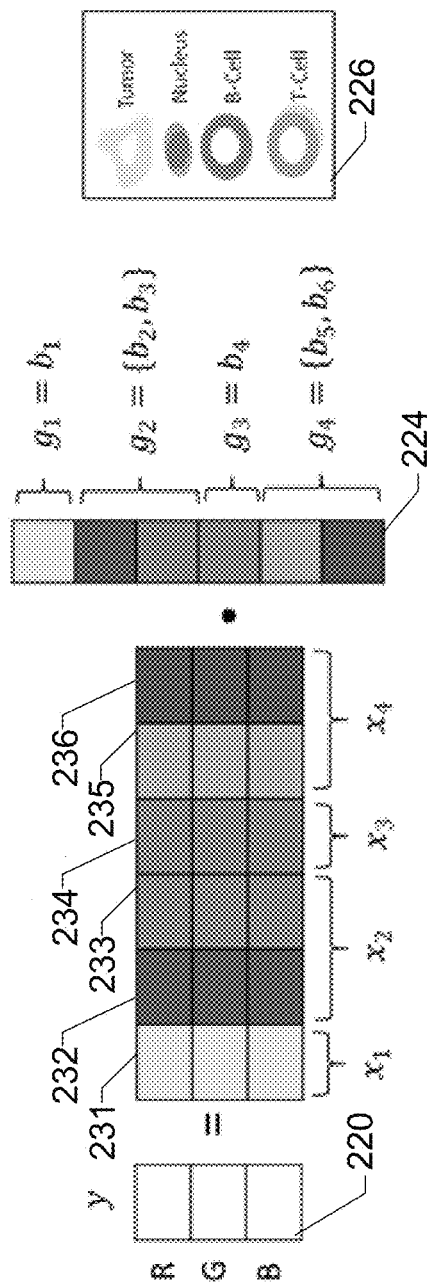
FIG. 2 depicts a framework of an unmixing algorithm, according to an exemplary embodiment of the subject disclosure.

FIG. 2 depicts a framework for group sparsity modeling, according to an exemplary embodiment of the subject disclosure. The framework is an elaboration of the unmixing algorithm y=X·b. The RGB image y obtained from the imaging system or other input is represented as 220, the reference color matrix X includes a plurality of columns representing, from left to right, stains 1 to 6, and the unmixed image b corresponding to each stain may be represented by a matrix 224. For example, column 231 may represent a tumor cell cytokeratin (e.g. Dabsyl/Oscar), column 232 may represent a regulatory T-cell nucleus (e.g. TAMRA/FP3), column 233 may represent a universal nucleus (e.g. HTX), column 234 may represent a B-cell membrane (e.g. Cy5/CD20), column 5 may represent a universal T-cell membrane (e.g. Rho110/CD3), and column 6 may represent a cytotoxic T-cell membrane (e.g. Cy5T/CD8). Each of the six stains 231-236 may be grouped into four different groups $g_1, g_2$, etc., where co-localized stains are in the same group, based on the groups depicted in key 226. Based on this biological co-localization information of the biomarkers, it may be straightforward to conclude that only two colors can co-exist at each pixel for this case. The unmixing algorithm, for an exemplary multiplex IHC image, may perform operations including: activating only one group of stains with the contribution weights from the other groups marked as zero for each pixel, and, within the activated group, estimating the fractions of the contributions from each constituent stain. As a result of these conditions the unmixing problem is solved by the unmixing method using a group sparsity framework so as to ensure the sparsity among the group but non-sparsity within the group. Group sparsity and group lasso operations are further described in N. Simon, et al., "A Sparse Group Lasso". Journal of Computational and Graphical Statistics, vol. 22(2), pp. 231-245, 2013. However, in accordance with the operations described herein, the following example may be used.

For example, six stains may be available resulting in M=6 based on the explanation above. Two of them are co-localized membrane stains and two are co-localized nucleus stains. One is tumor cytokeratin stain and the rest is a membrane stain but only for a B-cell. This information enables dividing the stains into four groups (N=4) as shown in FIG. 2. For instance, $g_2$ contains $b_2$ and $b_3$ that are corresponding to the two co-located nucleus stains and each column of $x_2$ is the reference color for the stain within the $2_{nd}$ group. However, the 4th stain of the B-cell marker does not co-localize with other biomarkers, so $g_3$ only has one single member $b_4$.

Specifically to this example, the unmixing problem may formulated as a group lasso criterion, i.e. as the following convex optimization problem or cost function:

$$\min_b \left\| y - \sum_{i=1}^{N} x_i g_i \right\|_2^2 + \lambda \sum_{i=1}^{N} \sqrt{q_i} \|g_i\|_2$$

where $b=[b_1, b_2, \ldots, b_M]^t = [g_1^t, g_2^t, \ldots, g_N^t]^t$ and $\|\cdot\|_2$ is the Euclidean norm without squared. The first term in Eqn. 3 is the reconstruction error between the original RGB image and the unmixed images, and may be solved for the linear system as further described in A. C. Ruifrok and D. A. Johnston, "Quantification of Histochemical Staining by Color Deconvolution", Anal. Quant. Cytol. Histol., 23:291-299, 2001, which minimize the least square error between the intensity of the raw image and the possible linear combination of the reference colors that approximate the raw image. The second term is the group sparsity constraint. $\lambda$ is the regularization parameter that controls the amount of the group sparsity constraint in the second term. When this cost function is minimized, ideally only a very small number of groups are active in the results due to the group sparsity constraint. This equation may be solved by an alternative direction method of multipliers (ADMM) algorithm, as further described in S. Boyd, et al., "Distributed Optimization and Statistical Learning via the Alternating Direction Method of Multipliers," Foundations and Trends in Machine Learning, vol. 3(1), pp. 1-122, 2010. This model will act like a Lasso optimization method at the group level. The entire groups will be dropped out in the result when an optimal b is found. That is, in an exemplary embodiment, only a small number of $g_i$ are non-zero.

When the size of each group $q_i=1$, the model becomes equivalent to a lasso as described above. In this case, no biological co-localization information is used in this model. However the sparsity constraints on the unmixed channels are retained which suppress the background noises and the system remains to be solvable. In the experimental results shown with respect to FIG. 3 onwards, the efficacy of lasso unmixing is demonstrated by limiting the size of the group to 1.

The tuning parameter of the Lasso or group Lasso criterion, i.e. the regularization parameter k, can be chosen by cross-validation. For example, the image data is partitioned into complimentary subsets. The unmixing is then performed separately for the subsets using the Lasso or group Lasso criterion as described above with various choices for $\lambda$ and the one that leads to the least unmixing error is chosen.

For the data set having ground truth unmixing results, an error is calculated for each of the unmixing solutions and the choice of a value for $\lambda$ that yields the lowest error is chosen for performing the unmixing of the complete image data using that choice of λ for the Lasso or group Lasso criterion. The ground truth can be obtained by manual annotation. For example, the selection of a value fork can be performed by the steps of dividing the image data into at least a first subset and a second subset, choosing a first value $\lambda_1$ and a second value $\lambda_2$ for the tuning parameter λ, calculating a first solution using the group Lasso or Lasso criterion for the first subset with the first value $\lambda_1$ of the tuning parameter λ, calculating a first error of the unmixing result obtained from the first solution, calculating a second solution of the group Lasso or Lasso criterion for the second subset with the second value $\lambda_2$ of the tuning parameter, calculating a second error of the unmixing result obtained from the second solution, selecting one of the first value $\lambda_1$ and second value $\lambda_2$ of the tuning parameter that results in the lowest error.

For example, the image data is divided into 10 subsets and respective 10 different values for λ are chosen as candidate values.

The candidate value for λ that yields a solution for the respective subset of the image data that has the lowest error is then selected for unmixing the entire image data or further image data that is acquired from the same or another tissue sample using the lasso or group lasso criterion.

As described above, the modules include logic that is executed by processor 105. "Logic", as used herein and throughout this disclosure, refers to any information having the form of instruction signals and/or data that may be applied to affect the operation of a processor. Software is one example of such logic. For example, the operations described herein may be implemented in a software language, for example, in C++, to provide fast computation. In such an embedment, it may cost about 7 seconds to unmix a 750 by 1400 image on an Intel Core i7 1.87 GHZ PC. In should be understood by one skilled in the art that the language used for implementation of the disclosed operations may vary. Examples of processors are processors (processing units), microprocessors, digital signal processors, controllers and microcontrollers, etc. Logic may be formed from signals stored on a computer-readable medium or digital storage medium such as memory 110 that, in an exemplary embodiment, may be a random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network. Moreover, the modules need not be executed in any specific order.

The remaining figures depict simulated and actual results of how the unmixing operations described herein are empirically validated and compared to existing techniques. Although the images depicted are from a CCD camera, i.e. RGB images, these operations may also be applied to spectral images such as those obtained via a spectral camera or scanner device, or any image comprising a mixture of the underlying co-localized biomarker expressions. Moreover, the disclosed operations are described with respect to cancerous tissue but may be applied to any tissue type and disease state.

Figure 3A:
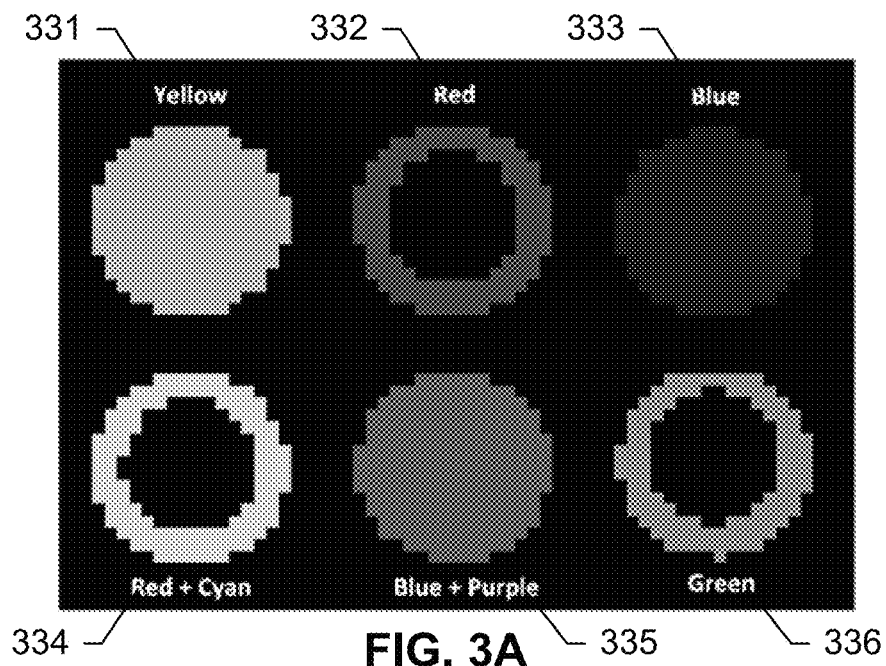
FIGS. 3A-3C depict a simulated example of an image to be unmixed, and variations of a mean square error (MSE) of the regularization parameter $\lambda$, according to exemplary embodiments of the subject disclosure.
Figure 3B:
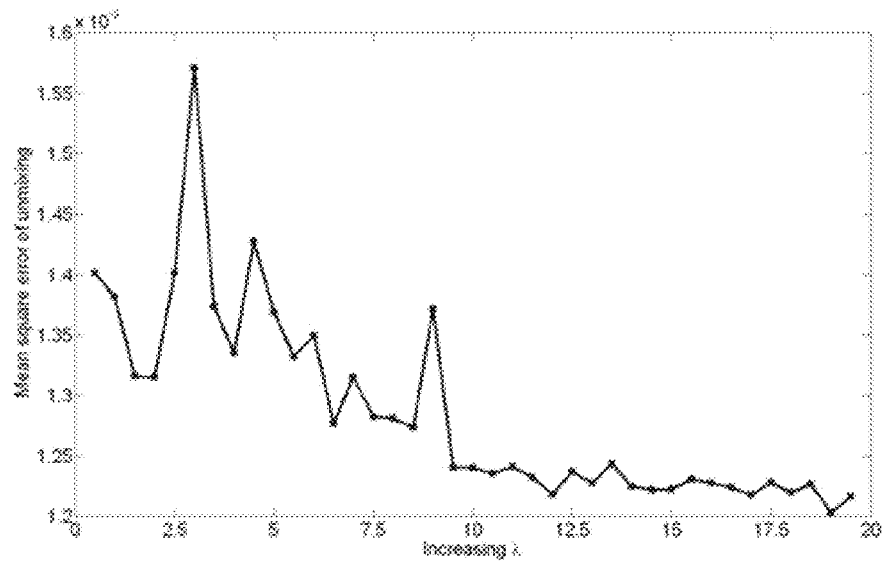
Figure 3C:
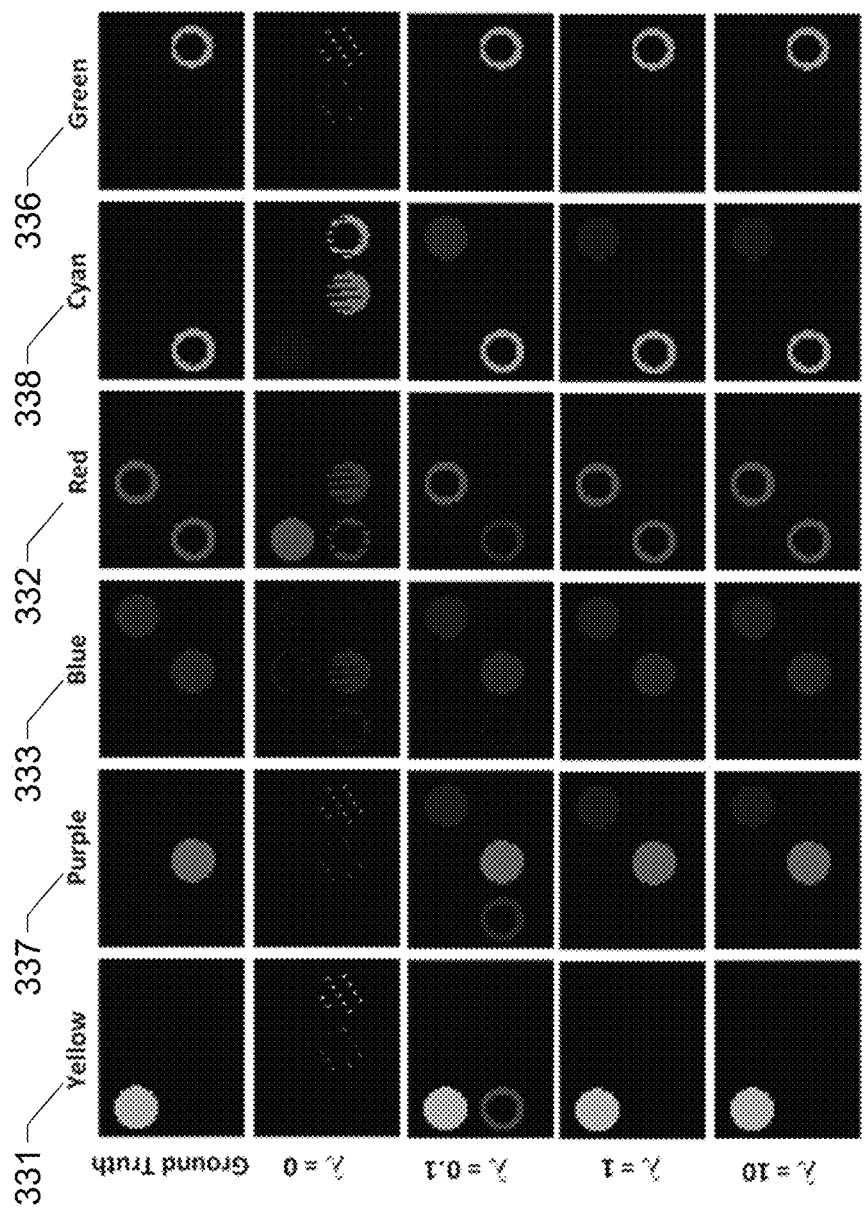

FIGS. 3A-3C depict a simulated example of an image to be unmixed, and a mean square error (MSE) of the regularization parameter λ increasing. FIG. 3A depicts a simulated image comprising six colors following the stain co-localization and grouping of FIG. 2. The six colors depicted are yellow 331, red 332, blue 333, red+cyan 334, blue+purple 335, and green 336. Referring to FIG. 3B, as the group sparsity regularization parameter increases, more accurate unmixing is achieved. FIG. 3B depicts the MSE compared to the ground truth unmixed channels for λ within the range 0 to 20. The plot demonstrates that the system becomes stable when $\lambda \geq 10$. The example unmixing results are shown in FIG. 3C, depicting columns of colors yellow 331, purple 337, blue 333, red 332, cyan 338, and green 336. In FIG. 3, the first row shows the ground truth (i.e. ideal depiction) and the other rows showing the unmixed results by varying λ. When λ=0, the system becomes deficient, hence unmixing errors are observed as shown in the second row of FIG. 3C.

Figure 4:
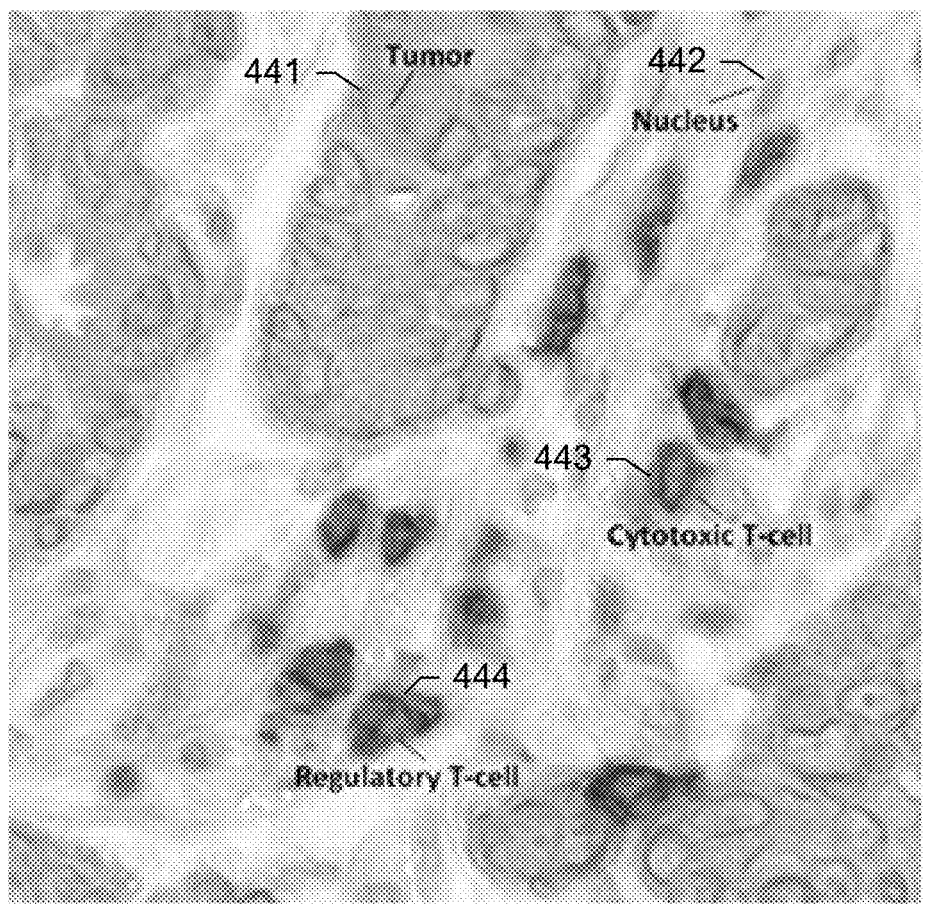
FIG. 4 depicts an example of a clinical data set containing several different cancer tissue samples that were used to test the disclosed operations, according to exemplary embodiments of the subject disclosure.
Figure 5:
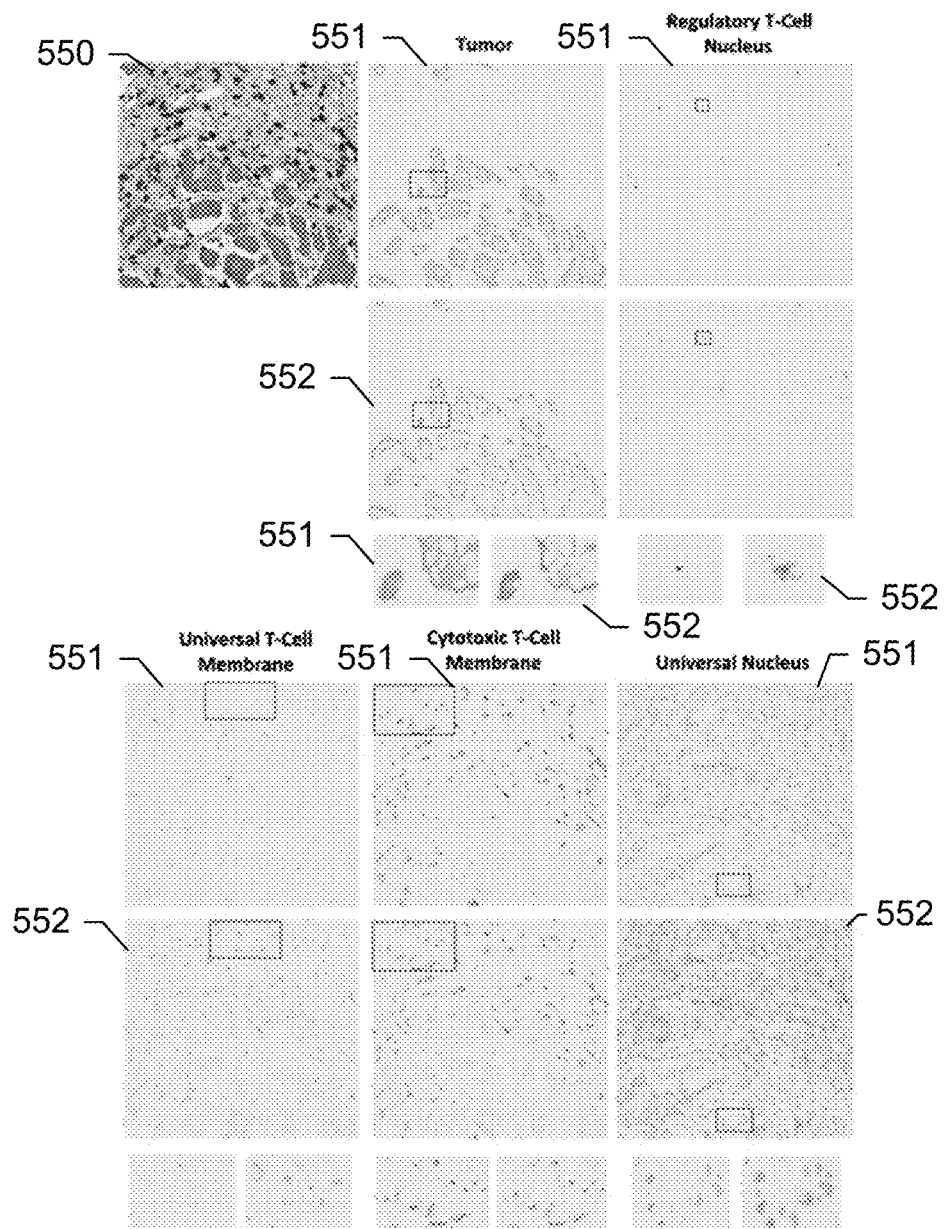
FIG. 5 depicts the unmixing examples of decomposing a multiplexed image into single stain channels using the prior art versus the group sparsity methods disclosed herein, in accordance with an exemplary embodiment of the subject disclosure.
Figure 6:
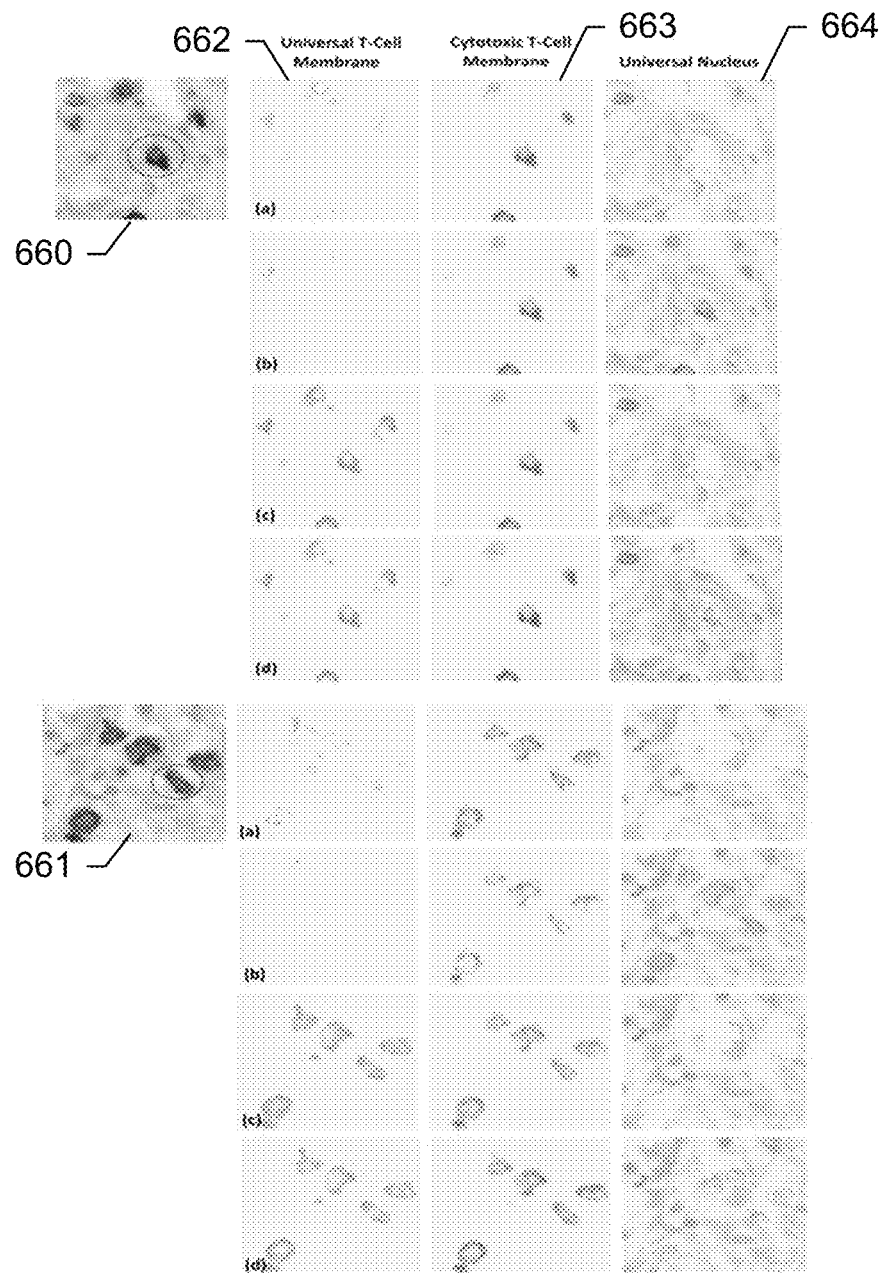
FIG. 6 depicts an example of orange only cells, according to an exemplary embodiment of the subject disclosure.

FIGS. 4-6 depict a clinical data set containing several different cancer issue samples that were used to test the disclosed operations, including colorectal cancer, non-small cell lung cancer, and breast cancer tissue samples that consist of 32 fields of view. The tissues were stained with following assay as shown in FIG. 4: yellow chromogen for tumor cell cytokeratin 441, purple for regulatory T-cell nucleus 444, blue for universal nucleus 442, light blue for B-cell membrane, orange for universal T-cell membrane and dark green for cytotoxic T-cell membrane 443.

FIG. 5 depicts the unmixing examples of decomposing a multiplexed image 550 into single stain channels using the prior art 551 versus the group sparsity methods 552 disclosed herein, in accordance with an exemplary embodiment of the subject disclosure. It can be seen from FIG. 5 that pixel discontinuities and artifacts are observed from the color system unmixing results. Instead of solving a multiple three color system using the nearest neighbor assignment, a single system may be solved for all the pixels, hence leading to smoother unmixed images depicted by reference 552. Meanwhile, the algorithm maintains the biological constraints as wells as reduces the background noises.

Since the green cytotoxic T-cell membrane marker is the subset of the orange universal T-cell membrane marker, FIG. 6 depicts an example of orange only cells (column 662), according to an exemplary embodiment of the subject disclosure. The figure shows a section of multiplexed images 661 zoomed in, with three channels of the region depicted in the following columns: universal T-cell membrane channel (orange) 662, cytotoxic T-cell membrane channel (green) 663, and universal nucleus channel 664. Images a-d represent different combinations of methods: (a) prior art without co-localization constraint, (b) group sparsity-based unmixing without co-localization constraint, (c) prior art with co-localization constraint, and (d) group sparsity-based unmixing with co-localization constraint. It can be seen that in the corresponding unmixed region of pure orange cells in column 662, the green signal is weak. However, strong green and orange signals exist in the other regions within the same image. This demonstrates that $L_2$ norm constraint is used within the group to linearly separate the color mixture into different stain contribution weights. Meanwhile, the prior art methods (a) and (c) are prone to unmixing errors due to the hard assignment of the system based on color similarity.

Figure 7:
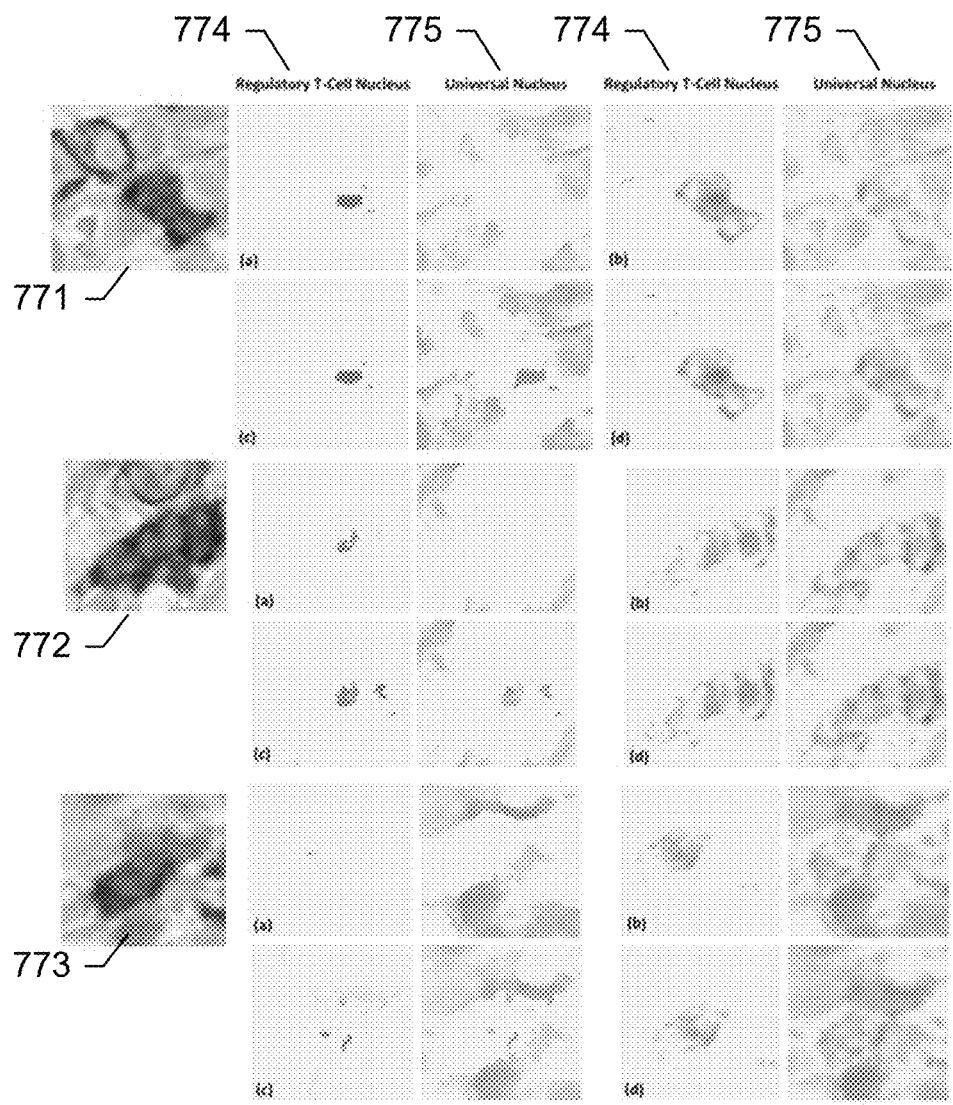
FIG. 7 depicts example images of nucleus co-localization cases, according to exemplary embodiments of the subject disclosure.
Figure 8:
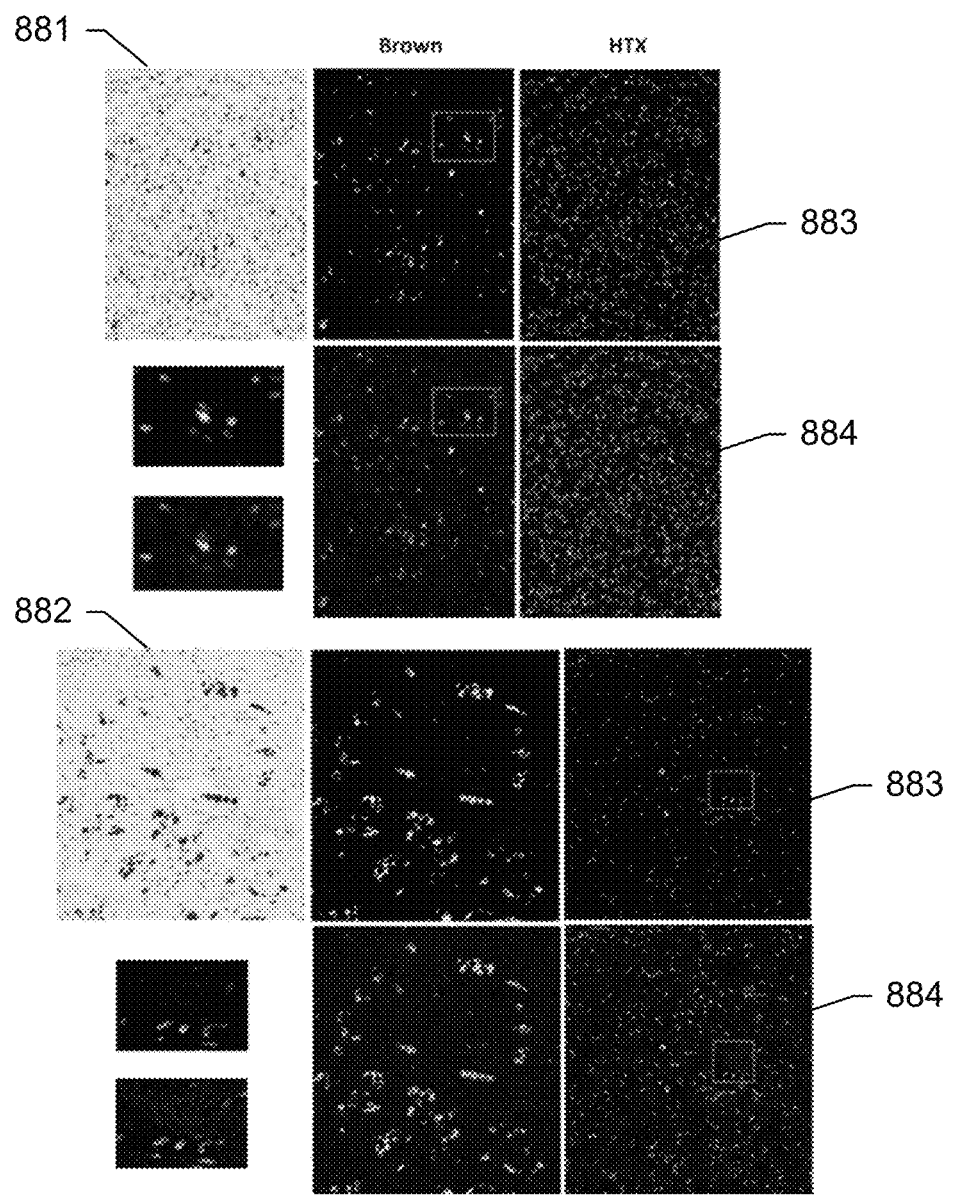
FIG. 8 depicts less background noise using the proposed sparse constrained method versus prior art methods for RGB images with a group size set to 1, according to an exemplary embodiment of the subject disclosure.

FIG. 7 depicts example images of nucleus co-localization cases, according to exemplary embodiments of the subject disclosure. This figure shows the advantages of having biological co-localization constraints. As in FIG. 6, this figure shows multiplexed images 771, 772, and 773, with three channels of the region depicted in the following columns: regulatory T-cell nucleus channel 774 (purple), and universal nucleus channel 775 (blue). Images a-d represent different combinations of methods: (a) prior art without co-localization constraint, (b) group sparsity-based unmixing without co-localization constraint, (c) prior art with co-localization constraint, and (d) group sparsity-based unmixing with co-localization constraint. The presence of nuclei is shown in both purple 774 and blue 775 channels if group sparsity is used. However, no purple is observed if no co-localization constraint is used. As a special case example, the algorithm can also be used to less than three color unmixing. The group size may be set to 1, and compared with prior art methods for 2-stain unmixing. However, the group size may vary, for different applications, in various embodiments of the subject disclosure. The results are shown in FIG. 8, depicting much less background noise using the proposed sparse constrained method 884 versus prior art methods 883 for RGB images 881 and 882 with a group size set to 1.

Therefore, embodiments disclosed herein propose a novel color unmixing strategy for multiplexed brightfield histopathology images based on a group sparsity model. The biological co-localization information of the bio-markers is explicitly defined in the regularization term to produce biologically meaningful unmixing results. The experiments of both synthetic and clinical data demonstrate the efficacy of the proposed algorithm in terms of accuracy, stability and robustness.

Electronic processing devices, such as computers, typically include known components, such as a processor, an operating system, system memory, memory storage devices, input-output controllers, input-output devices, and display devices. It will also be understood by those of ordinary skill in the relevant art that there are many possible configurations and components of an electronic processing device and may also include cache memory, a data backup unit, and many other devices. Examples of input devices include a keyboard, a cursor control devices (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provide one or more graphical representations to a user. Interfaces are typically enabled to accept user inputs using means of selection or input known to those of ordinary skill in the related art. The interface may also be a touch screen device. In the same or alternative embodiments, applications on an electronic processing device may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework.

Those of ordinary skill in the related art will appreciate that interfaces may include one or more GUI's, CLI's or a combination thereof. A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores". In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various programs that may be written in a variety of programming languages. An operating system, typically in cooperation with a processor, coordinates and executes functions of the other components of an electronic processing device. An operating system also provides scheduling, input-output control, file and data management, memory management, and communication control and related services, all in accordance with known techniques.

System memory may include any of a variety of known or future memory storage devices that can be used to store the desired information and that can be accessed by an electronic processing device, such as a computer. Computer readable media or digital storage media may include volatile and non-volatile, removable and non-removable media implemented in any method or technology for storage of information such as digitally encoded instructions, such as computer readable instructions, data structures, program modules, or other data. Examples include any commonly available random access memory (RAM), read-only memory (ROM), electronically erasable programmable read-only memory (EEPROM), digital versatile disks (DVD), magnetic medium, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a software program and/or data. Software programs, also called control logic, typically are stored in system memory and/or the program storage device used in conjunction with memory storage device. In some embodiments, a program product is described comprising a digital storage medium having control logic (software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of an electronic processing device communicate with each other via a system bus. Some embodiments of an electronic processing device may communicate with some functional elements using network or other types of remote communications. As will be evident to those skilled in the relevant art, an instrument control and/or a data processing application, if implemented in software, may be loaded into and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, an electronic processing device may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another electronic processing device using a network and may for instance comprise what are generally referred to as "Web Browsers". In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network, such as a computer network, comprising a worldwide system of interconnected networks that is commonly referred to as the internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

Figure 9:
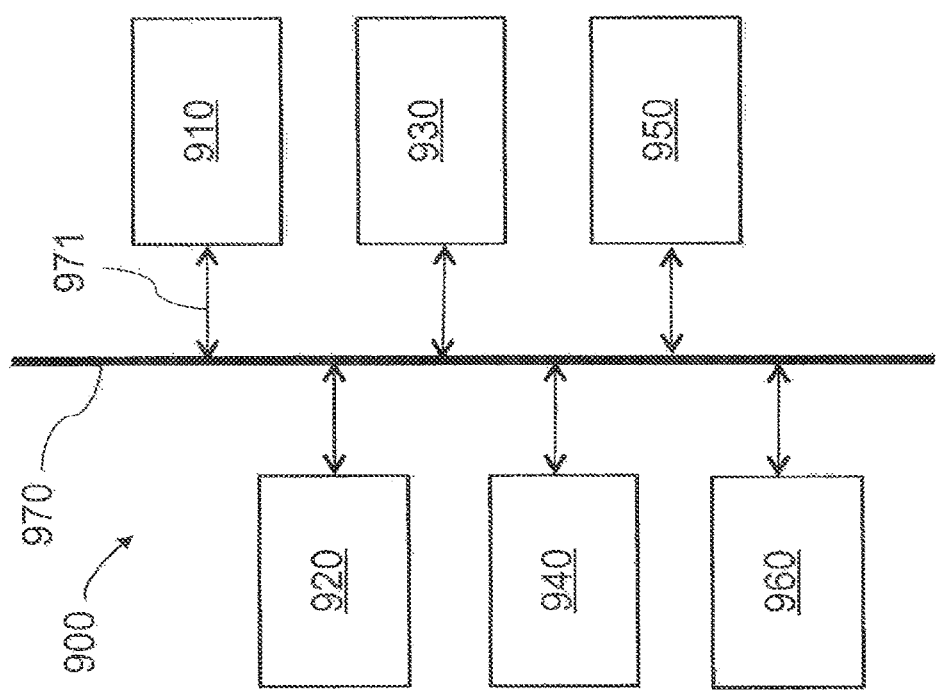
FIG. 9 schematically shows an embodiment of a tissue analysis system.

FIG. 9 schematically shows an embodiment of a tissue analysis system 900 in accordance with the present disclosure, e.g. as described above.

In the illustrated embodiment, tissue analysis system 900 comprises a color data storage module 910, a co-location data storage module 920, a tissue image data storage module 930, a tissue image analysis module 940, an optional tissue imaging module 950, an optional tissue staining module 960 and a communication bus 970 comprising a plurality of communication links 971 (for the sake of legibility, only one of the communication links bears a reference sign). Communication bus 970 and the communication links 971 communicatively interconnect the aforementioned components 910-960.

Figure 10:
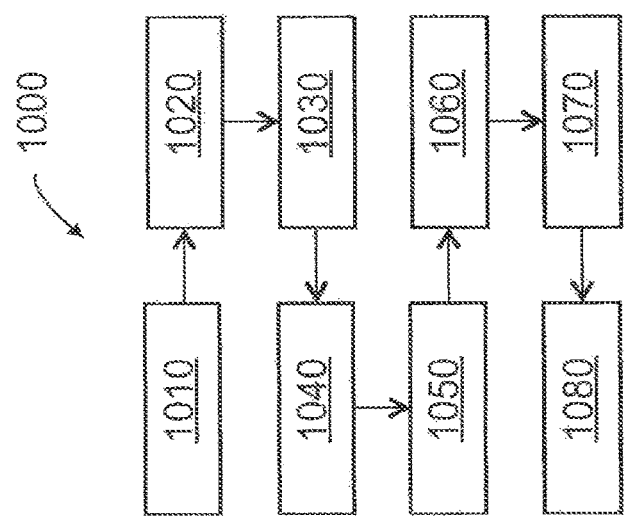
FIG. 10 schematically shows a flow diagram of an embodiment of a tissue analysis method.

FIG. 10 schematically shows a flow diagram 1000 of an embodiment of a tissue analysis method in accordance with the present disclosure, e.g. as described above.

In the illustrated embodiment, flow diagram 1010 comprises an optional step 1010 of staining a tissue sample, an optional step 1020 of imaging the (stained) tissue sample, a step 1030 of storing color data, a step 1040 of storing coal location data, a step 1050 of storing a plurality of pixels representative of the tissue image, a step 1060 of unmixing a tissue image, a step 1070 of determining a group for which a minimum differences smallest and a step 1080 of outputting data indicative of a tissue feature as an analysis result.

In the present disclosure, the verb "may" is used to designate optionality/noncompulsoriness. In other words, something that "may" can, but need not. In the present disclosure, the verb "comprise" may be understood in the sense of including. Accordingly, the verb "comprise" does not exclude the presence of other elements/actions. In the present disclosure, relational terms such as "first," "second," "top," "bottom" and the like may be used solely to distinguish one entity or action from another entity or action without necessarily requiring or implying any actual such relationship or order between such entities or actions.

In the present disclosure, the term "any" may be understood as designating any number of the respective elements, e.g. as designating one, at least one, at least two, each or all of the respective elements. Similarly, the term "any" may be understood as designating any collection(s) of the respective elements, e.g. as designating one or more collections of the respective elements, a collection comprising one, at least one, at least two, each or all of the respective elements. The respective collections need not comprise the same number of elements.

In the present disclosure, the expression "at least one" is used to designate any (integer) number or range of (integer) numbers (that is technically reasonable in the given context). As such, the expression "at least one" may, inter alia, be understood as one, two, three, four, five, ten, fifteen, twenty or one hundred. Similarly, the expression "at least one" may, inter alia, be understood as "one or more," "two or more" or "five or more."

In the present disclosure, expressions in parentheses may be understood as being optional. As used in the present disclosure, quotation marks may emphasize that the expression in quotation marks may also be understood in a figurative sense. As used in the present disclosure, quotation marks may identify a particular expression under discussion.

In the present disclosure, many features are described as being optional, e.g. through the use of the verb "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A method comprising:
accessing an image depicting a biological sample stained with a set of biomarkers;
accessing co-localization data for the set of biomarkers, wherein the co-localization data defines a plurality of groups of biomarkers within the set of biomarkers, each group of biomarkers of the plurality of groups of biomarkers including a subset of biomarkers of the set of biomarkers, wherein a first biomarker and a second biomarker of a subset of biomarkers of a first group of biomarkers of the plurality of groups of biomarkers represent a common biological structure; and
unmixing, based on the co-localization data, the image.

2. The method of claim 1, further comprising:
converting the image into an optical density space.

3. The method of claim 2, wherein unmixing the image comprises unmixing the optical density space.

4. The method of claim 1, wherein unmixing, based on the co-localization data, the image generates a result that identifies a first estimated fraction of contribution of the first biomarker and a second estimated fraction of contribution of the second biomarker.

5. The method of claim 1, wherein unmixing, based on the co-localization data, the image comprises activating a group of biomarkers of the plurality of groups of biomarkers with contribution weights from other groups of biomarkers of the plurality of groups of biomarkers and estimating fractions of contributions for each biomarker of the group of biomarkers.

6. The method of claim 1, wherein the common biological structure includes a cell membrane or a nucleus.

7. The method of claim 6, wherein the common biological structure further includes a cell type associated with the cell membrane or the nucleus.

8. A system comprising one or more processors and at least one memory, the at least one memory storing instructions which, when executed by the one or more processors, cause the system to perform operations comprising:
accessing an image depicting a biological sample stained with a set of biomarkers;
accessing co-localization data for the set of biomarkers, wherein the co-localization data defines a plurality of groups of biomarkers within the set of biomarkers, each group of biomarkers of the plurality of groups of biomarkers including a subset of biomarkers of the set of biomarkers, wherein a first biomarker and a second biomarker of a subset of biomarkers of a first group of biomarkers of the plurality of groups of biomarkers represent a common biological structure; and
unmixing, based on the co-localization data, the image.

9. The system of claim 8, further comprising:
converting the image into an optical density space.

10. The system of claim 9, wherein unmixing the image comprises unmixing the optical density space.

11. The system of claim 8, wherein unmixing, based on the co-localization data, the image generates a result that identifies a first estimated fraction of contribution of the first biomarker and a second estimated fraction of contribution of the second biomarker.

12. The system of claim 8, wherein unmixing, based on the co-localization data, the image comprises activating a group of biomarkers of the plurality of groups of biomarkers with contribution weights from other groups of biomarkers of the plurality of groups of biomarkers and estimating fractions of contributions for each biomarker of the group of biomarkers.

13. The system of claim 8, wherein the common biological structure includes a cell membrane or a nucleus.

14. The system of claim 13, wherein the common biological structure further includes a cell type associated with the cell membrane or the nucleus.

15. A non-transitory computer-readable medium comprising instructions which, when executed by one or more processors of a computing system, cause the computing system to perform operations comprising:
accessing an image depicting a biological sample stained with a set of biomarkers;
accessing co-localization data for the set of biomarkers, wherein the co-localization data defines a plurality of groups of biomarkers within the set of biomarkers, each group of biomarkers of the plurality of groups of biomarkers including a subset of biomarkers of the set of biomarkers, wherein a first biomarker and a second biomarker of a subset of biomarkers of a first group of biomarkers of the plurality of groups of biomarkers represent a common biological structure; and
unmixing, based on the co-localization data, the image.

16. The non-transitory computer-readable medium of claim 15, further comprising:
    converting the image into an optical density space.

17. The non-transitory computer-readable medium of claim 16, wherein unmixing the image comprises unmixing the optical density space.

18. The non-transitory computer-readable medium of claim 15, wherein unmixing, based on the co-localization data, the image generates a result that identifies a first estimated fraction of contribution of the first biomarker and a second estimated fraction of contribution of the second biomarker.

19. The non-transitory computer-readable medium of claim 15, wherein unmixing, based on the co-localization data, the image comprises activating a group of biomarkers of the plurality of groups of biomarkers with contribution weights from other groups of biomarkers of the plurality of groups of biomarkers and estimating fractions of contributions for each biomarker of the group of biomarkers.

20. The non-transitory computer-readable medium of claim 15, wherein the common biological structure includes a cell membrane or a nucleus.

* * * * *